(12) United States Patent
Wu (10) Patent No.: US 10,534,246 B1
(45) Date of Patent: Jan. 14, 2020

(54) COOLING SYSTEM AND PROJECTOR HAVING THE SAME

(71) Applicant: DELTA ELECTRONICS, INC., Taoyuan (TW)

(72) Inventor: Kuo-Tung Wu, Taoyuan (TW)

(73) Assignee: DELTA ELECTRONICS, INC., Taoyuan (TW)

(*) Notice: Subject to any disclaimer, the term of this patent is extended or adjusted under 35 U.S.C. 154(b) by 0 days.

(21) Appl. No.: 16/292,292

(22) Filed: Mar. 4, 2019

(30) Foreign Application Priority Data

Sep. 28, 2018 (CN) .......................... 2018 1 1143158

(51) Int. Cl.
  *G03B 21/14* (2006.01)
  *H04N 9/31* (2006.01)
  *G03B 21/16* (2006.01)

(52) U.S. Cl.
  CPC .......... *G03B 21/16* (2013.01); *H04N 9/3144* (2013.01)

(58) Field of Classification Search
  CPC .......... G03B 21/14; G03B 21/16; H04N 9/31; H04N 9/3144
  USPC ........................................ 353/57, 58, 60, 61
  See application file for complete search history.

(56) References Cited

U.S. PATENT DOCUMENTS

| | | | |
|---|---|---|---|
| 7,922,335 B2 * | 4/2011 | Sakai ................... | H04N 9/3144 353/58 |
| 8,596,796 B2 | 12/2013 | Namba et al. | |
| 9,678,415 B2 * | 6/2017 | Saito ....................... | G03B 21/16 |
| 2014/0333904 A1 * | 11/2014 | Saito ....................... | G03B 21/16 353/58 |

FOREIGN PATENT DOCUMENTS

| CN | 101702073 A | 5/2010 |
|---|---|---|
| TW | 201802564 A | 1/2018 |

* cited by examiner

*Primary Examiner* — William C. Dowling
(74) *Attorney, Agent, or Firm* — CKC & Partners Co., LLC (57) ABSTRACT

A mercury lamp cooling system includes a tilt sensor, a controller, a first and second blowers and a flow guiding structure. The flow guiding structure includes a first and second flow channel and two flow switch devices. The controller is electrically connected to the tilt sensor, the first and second blower and two flow switch devices. The first flow channel includes a first opening facing the first blower and a second and third opening facing the mercury lamp. The second flow channel includes a fourth opening facing the second blower and a fifth and sixth openings facing the mercury lamp. The controller controls the flow switch devices based on a tilt angle of a projector such that the air flow passes through at least one of the second and third opening and at least one of the fifth and sixth opening.

20 Claims, 6 Drawing Sheets

COOLING SYSTEM AND PROJECTOR HAVING THE SAME

CROSS-REFERENCE TO RELATED APPLICATION

This application claims priority to Chinese Application Serial Number 201811143158.9, filed Sep. 28, 2018, the disclosure of which is incorporated herein by reference in its entirety.

BACKGROUND

Technical Field

The present disclosure relates to a cooling system and a projector having the cooling system.

Description of Related Art

The projection angle of a projector is usually changed depending on the requirements of operation, thus the proper cooling location of the light source changes. For example, for a mercury lamp, if the cooling direction is fixed relative to the mercury lamp, it would become difficult to maintain the cooling effect when the projector angle of the projector is changed.

SUMMARY

One embodiment of the present invention is a cooling system applied for a projector. The projector includes a housing and a mercury lamp. The cooling system includes a tilt sensor, a controller, a first fan and a second fan, and a flow guide structure. The tilt sensor is disposed on the housing and configured to sense a tilt angle of the projector. The controller is electrically connected to the tilt sensor. The first fan and the second fan are electrically connected to the controller and configured to form an air flow. The flow guide structure includes a first flow channel, a second flow channel, and two flow switch devices. The first flow channel includes a first opening, a second opening and a third opening. The first opening faces the first fan, and the second opening and the third opening face the mercury lamp. The second flow channel includes a fourth opening, a fifth opening and a sixth opening. The fourth opening faces the second fan, and the fifth opening and the sixth opening face the mercury lamp. The two flow switch devices are respectively disposed in the first flow channel and the second flow channel and are electrically connected to the controller. The controller controls the flow switch devices based on the tilt angle to make the air flow pass through at least one of the second opening and the third opening and at least one of the fifth opening and the sixth opening.

In some embodiments of the present invention, the mercury lamp includes a lamp wick. The long axis of the lamp wick is perpendicular to the directions of the second opening and the third opening of the first flow channel and is perpendicular to the directions of the fifth opening and the sixth opening of the second flow channel.

In some embodiments of the present invention, the mercury lamp is surrounded by the second opening and the third opening of the first flow channel and is surrounded by the fifth opening and the sixth opening of the second flow channel.

In some embodiments of the present invention, the second opening and the third opening of the first flow channel respectively face the fifth opening and the sixth opening of the second flow channel.

In some embodiments of the present invention, the second opening and the third opening are respectively disposed at the left side and the lower side of the mercury lamp, and the fifth opening and the sixth opening are respectively disposed at the right side and the upper side of the mercury lamp.

In some embodiments of the present invention, the first flow channel includes a first extending portion, a second extending portion and a first connecting portion connected with the first extending portion and the second extending portion. The second flow channel includes a third extending portion, a fourth extending portion and a second connecting portion connected with the third extending portion and the fourth extending portion. The first extending portion and the second extending portion respectively include the second opening and the third opening. The third extending portion and the fourth extending portion respectively include the fifth opening and the sixth opening. The two flow switch devices are respectively located in the first connecting portion and the second connecting portion.

In some embodiments of the present invention, the first extending portion and the third extending portion are respectively located at the left side and the right side of the mercury lamp, and the fourth extending portion and the fifth portion are respectively located at the upper side and the lower side of the mercury lamp.

In some embodiments of the present invention, the two air flow switch devices respectively include a sensor electrically connected to the controller.

One embodiment of the present invention is a projector. The projector includes a housing, a mercury lamp, a tilt sensor, a controller, a first fan and a second fan, and a flow guide structure. The mercury lamp includes a lamp wick. The tilt sensor is disposed on the housing and configured to sense a tilt angle of the projector. The controller is electrically connected to the tilt sensor. The first fan and the second fan are electrically connected to the controller and configured to form an air flow. The flow guide structure includes a first flow channel, a second flow channel, and two flow switch devices. The first flow channel includes a first opening, a second opening and a third opening. The first opening faces the first fan, and the second opening and the third opening face the mercury lamp. The second flow channel includes a fourth opening, a fifth opening and a sixth opening. The fourth opening faces the second fan, and the fifth opening and the sixth opening face the mercury lamp. The two flow switch devices are respectively disposed in the first flow channel and the second flow channel and are electrically connected to the controller. The controller controls the flow switch devices based on the tilt angle to make the air flow pass through at least one of the second opening and the third opening and at least one of the fifth opening and the sixth opening.

In some embodiments of the present invention, the mercury lamp includes a lamp wick. The long axis of the lamp wick is perpendicular to the directions of the second opening and the third opening of the first flow channel and is perpendicular to the directions of the fifth opening and the sixth opening of the second flow channel.

In some embodiments of the present invention, the mercury lamp is surrounded by the second opening and the third opening of the first flow channel and is surrounded by the fifth opening and the sixth opening of the second flow channel.

In some embodiments of the present invention, the second opening and the third opening of the first flow channel respectively face the fifth opening and the sixth opening of the second flow channel.

In some embodiments of the present invention, the second opening and the third opening are respectively disposed at the left side and the lower side of the mercury lamp, and the fifth opening and the sixth opening are respectively disposed at the right side and the upper side of the mercury lamp.

In some embodiments of the present invention, the first flow channel includes a first extending portion, a second extending portion and a first connecting portion connected with the first extending portion and the second extending portion. The second flow channel includes a third extending portion, a fourth extending portion and a second connecting portion connected with the third extending portion and the fourth extending portion. The first extending portion and the second extending portion respectively include the second opening and the third opening. The third extending portion and the fourth extending portion respectively include the fifth opening and the sixth opening. The two flow switch devices are respectively located in the first connecting portion and the second connecting portion.

In some embodiments of the present invention, the first extending portion and the third extending portion are respectively located at the left side and the right side of the mercury lamp, and the fourth extending portion and the fifth portion are respectively located at the upper side and the lower side of the mercury lamp.

In some embodiments of the present invention, the two air flow switch devices respectively include a sensor electrically connected to the controller.

In some embodiments of the present invention, when the projector is rotated by an angle that in is in a first range, the two air flow switch devices are respectively located at positions that open the second extending portion and the fourth extending portion, when the angle is in a second range, one of the two air flow switch devices is located at positions that open the first extending portion and the second extending portion, and another of the two air flow switch devices is located at positions that open the third extending portion and the fourth extending portion, when the angle is in a third range, the two air flow switch devices are respectively located at positions that open the first extending portion and the third extending portion, the first range is smaller than 90 degree and greater than the second range, and the third range is greater than 0 degree and smaller than the second range.

In some embodiments of the present invention, when the angle is in the first range, the air flow formed by the first fan and the second fan sequentially passes through the second extending portion, the mercury lamp, and the fourth extending portion, or the air flow sequentially passes through the fourth extending portion, the mercury lamp, and the second extending portion.

In some embodiments of the present invention, when the angle is in the second range, the air flow formed by the first fan and the second fan sequentially passes through the first flow channel, the mercury lamp, and the second flow channel, or the air flow sequentially passes through the second flow channel, the mercury lamp, and the first flow channel.

In some embodiments of the present invention, when the angle is in the third range, the air flow formed by the first fan and the second fan sequentially passes through the first extending portion, the mercury lamp, and the third extending portion, or the air flow sequentially passes through the third extending portion, the mercury lamp, and the first extending portion.

In the foregoing embodiments of the present invention, since the angle of the projector will be changed depend on the operation, the best cooling position of the mercury lamp changes. Therefore, controlling the first flow switch device and the second flow switch device by the controller based on the tilt angle measured by the tilt sensor enable the cooling system to cool down the mercury lamp in different directions. In the way, degrading of the cooling effect for the mercury lamp due to different tilt angles of the projector can be prevented, thus the mercury lamp can be maintained in a suitable temperature range to prolong the life span of the mercury lamp.

DETAILED DESCRIPTION

The following disclosure provides different embodiments, or examples, for implementing different features of the provided subject matter. Specific examples of components and arrangements are described below to simplify the present disclosure. These are, of course, merely examples and are not intended to be limiting. For example, the formation of a first feature over a second feature in the description that follows may include embodiments in which the first and second features are formed in direct contact, and may also include embodiments in which additional features may be formed that are between the first and second features, such that the first and second features are not in direct contact. In addition, the present disclosure may repeat reference numerals and/or letters in the various examples. This repetition does not in itself dictate a relationship between the various embodiments and/or configurations discussed.

Figure 1:
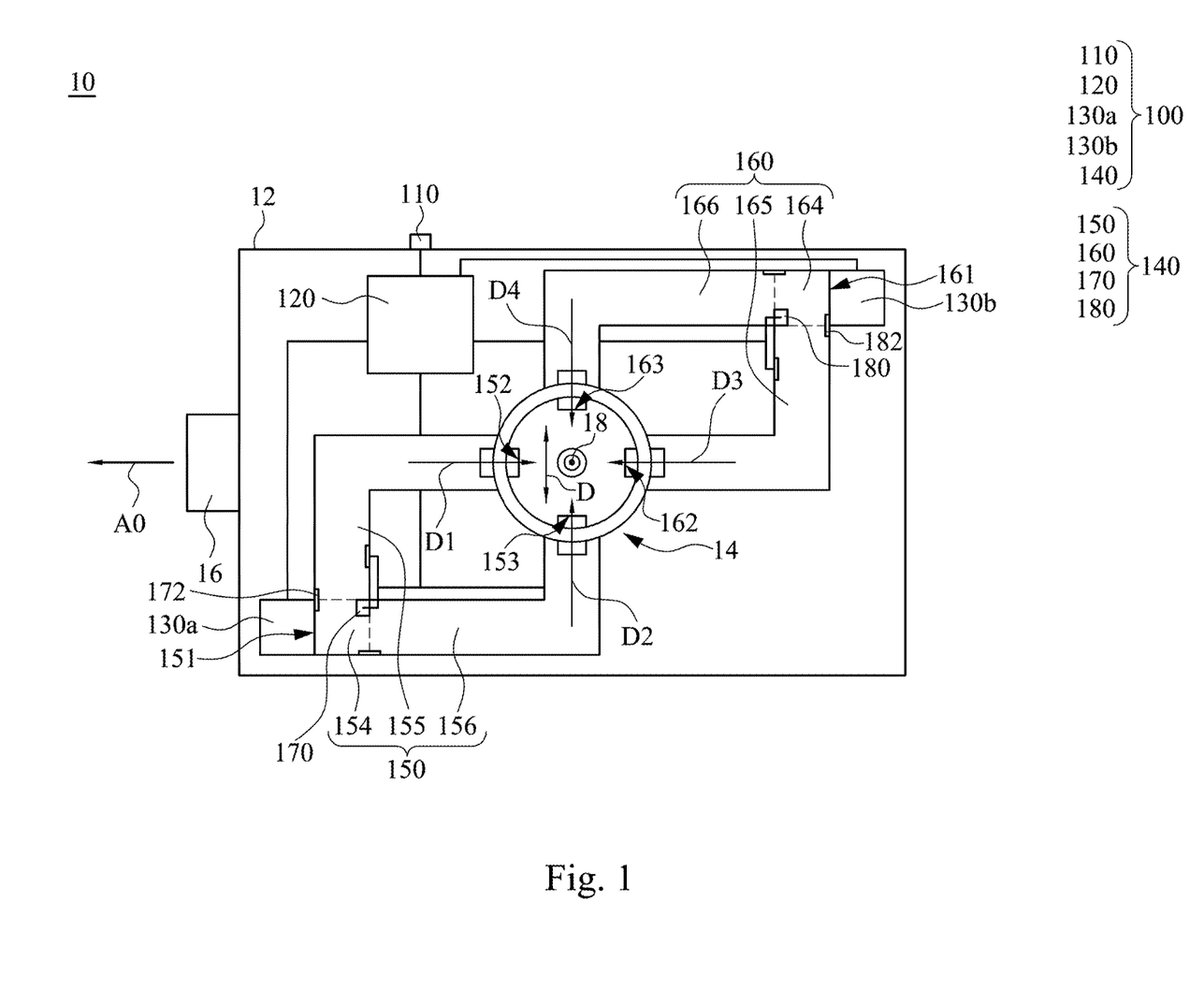
FIG. 1 is a side view of a projector having a cooling system according to one embodiment of the present disclosure.

FIG. 1 is a side view of a projector 10 having a cooling system 100 according to one embodiment of the present disclosure. The projector 10 includes a housing 12, a mercury lamp 14, a lens 16 and a cooling system 100. The mercury lamp 14 has a lamp wick 18. In the present embodiment, the mercury lamp 14 is a high pressure mercury lamp. In the present embodiment, the lens 16 is located at the left side of the projector 10 and is configured to project toward left side (direction A0) horizontally.

The cooling system 100 includes a tilt sensor 110, a controller 120, a first fan 130a, a second fan 130b, and a flow guide structure 140. The tilt sensor 110 is disposed on the housing 12 and configured to sense a tilt angle of the projector 10. The controller 120 is electrically connected to the tilt sensor 110. The first fan 130a and the second fan 130b are electrically connected to the controller 120 and are configured to form an air flow. The flow guide structure 140 includes a first flow channel 150, a second flow channel 160, a first flow switch device 170, and a second flow switch device 180.

The first flow channel 150 of the flow guide structure 140 has a first opening 151, a second opening 152 and a third opening 153. The first opening 151 faces the first fan 130a, the second opening 152 and the third opening 153 face the mercury lamp 14. The second flow channel 160 of the flow guide structure 140 has a fourth opening 161, a fifth opening 162 and a sixth opening 163. The fourth opening 161 faces the second fan 130b, the fifth opening 162 and the sixth opening 163 face the mercury lamp 14.

The first flow switch device 170 is disposed in the first flow channel 150 and is electrically connected to the controller 120. The second flow switch device 180 is disposed in the second flow channel 160 and is electrically connected to the controller 120. The controller 120 controls the first flow switch device 170 based on the tilt angle measured by the tilt sensor 110 to make the air flow pass through the second opening 152, or pass through the third opening 153, or simultaneously pass through the second opening 152 and the third opening 153 of the first flow channel 150. The controller 120 controls the second flow switch device 180 based on the tilt angle measured by the tilt sensor 110 to make the air flow pass through the fifth opening 162, or pass through the sixth opening 163, or simultaneously pass through the fifth opening 162 and the sixth opening 163 of the second flow channel 160.

Generally, when using the instruments having a mercury lamp 14 as the light source, a suitable temperature range should be maintained for the mercury lamp 14 (for example, the data from examination provided by the company of the mercury lamp 14) to make sure that the mercury lamp 14 can reach the reasonable life span. Accordingly, since the angle of the projector 10 will be changed depending on the operation, the best cooling position of the mercury lamp 14 changes. Therefore, controlling the first flow switch device 170 and the second flow switch device 180 by the controller 120 based on the tilt angle measured by the tilt sensor 110 enable the cooling system 100 to cool down the mercury lamp 14 in different directions. In the way, degrading of the cooling effect for the mercury lamp 14 due to different tilt angles of the projector 10 can be prevented, thus the mercury lamp 14 can be maintained in a suitable temperature range to prolong the life span of the mercury lamp 14.

Figure 2:
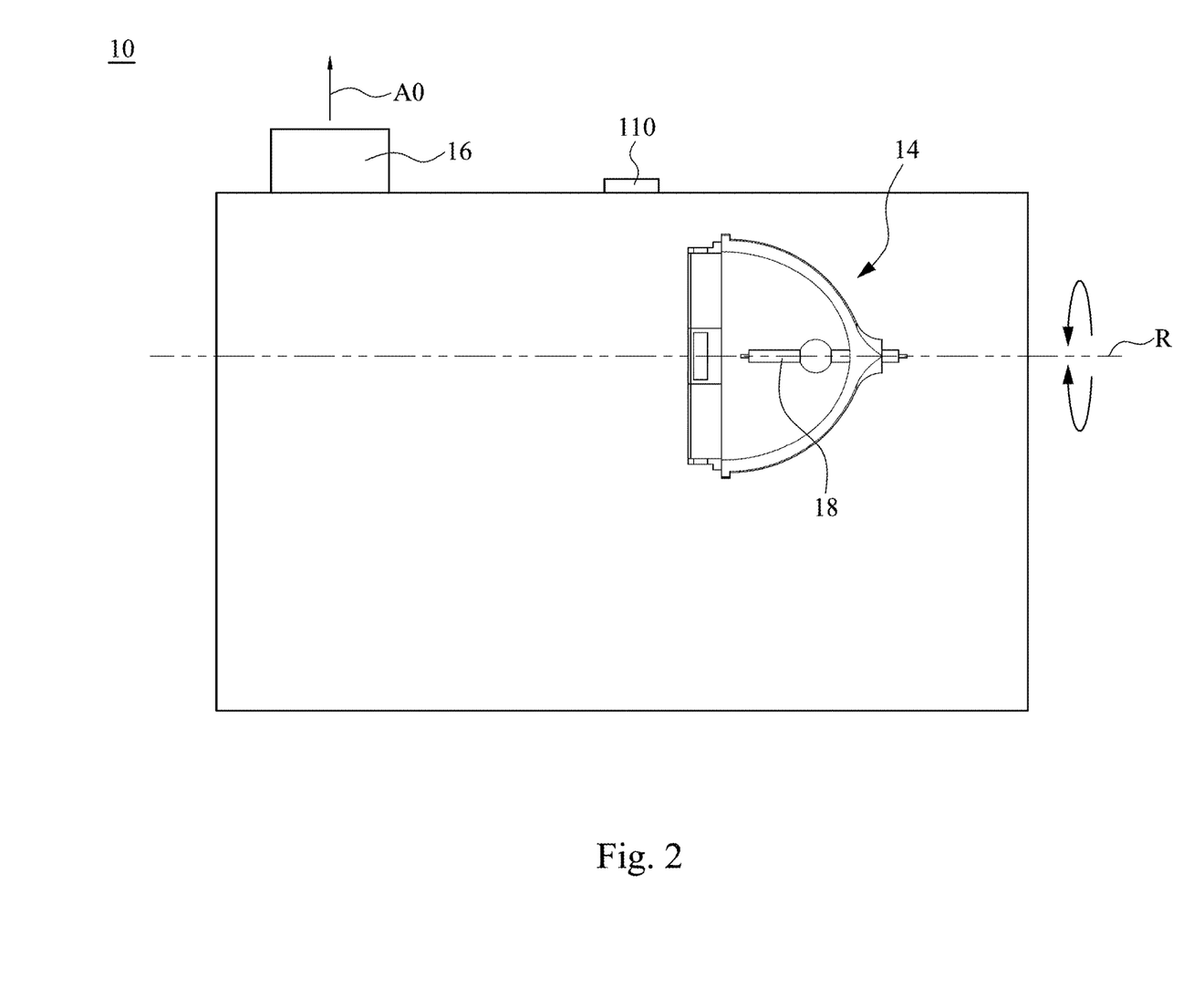
FIG. 2 is a top view of the projector in FIG. 1.

FIG. 2 is a top view of the projector 10 in FIG. 1. In the present embodiment, the lens 16 of the projector 10 is located at the front of the projector 10. As shown in the direction A0, the projector is configured to project toward the front. The lamp wick 18 of the mercury lamp 14 has a long axis R. It should be noted that the long axis R is also the rotation axis when the projector 10 is rotating. That is, when the projector 10 rotates according to the long axis R, the mercury lamp 14 is substantially rotated according to the lamp wick 18. Therefore, the projection direction shown by the direction A swings, and the angle change of the direction A0 is the aforesaid tilt angle of the projector 10.

For example, in the embodiment in FIG. 2, the projector 10 may be put on a desk horizontally or be hanging on the ceiling upside down horizontally, and the image may be projected onto a wall or a projection screen (as the projection direction shown by the direction A0). When the user is going to adjust the projection angle, the projector 10 will be rotated by an angle with long axis R as the rotation axis to adjust the location of the images projected on the wall of the projection screen.

Generally, heat produced by the mercury lamp 14 when lighting will accumulated on the top of the mercury lamp 14. In order to maintain the mercury lamp 14 in a suitable temperature range, producing air flow in the direction perpendicular to the lamp wick 18 (as shown by the direction D in FIG. 1) would provide a better cooling effect, so as to prolong the life span of the mercury lamp 14.

Figure 3:
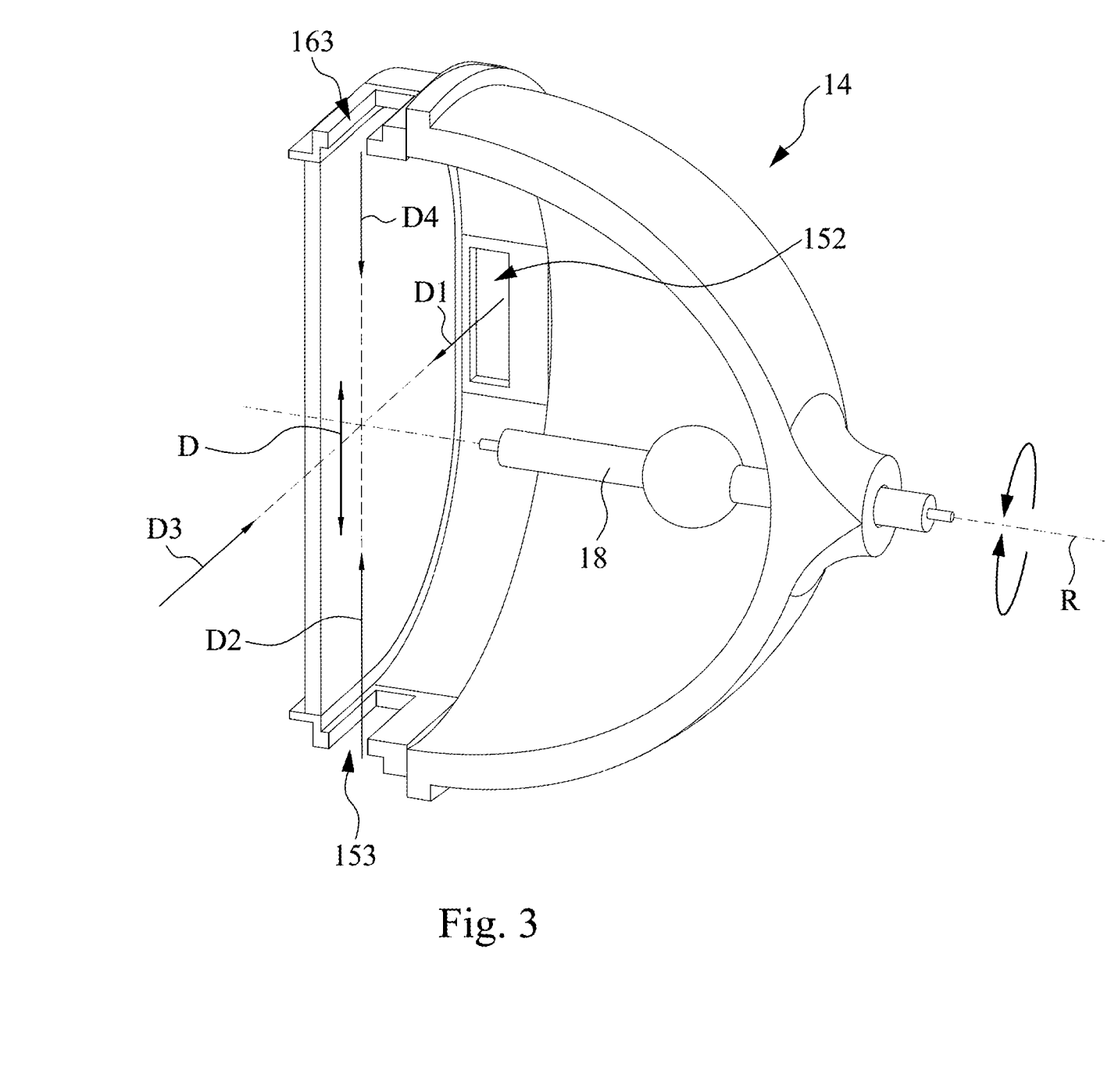
FIG. 3 is a partial perspective view of the mercury lamp in FIG. 2.

FIG. 3 is a partial perspective view of the mercury lamp 14 in FIG. 2. According to what has been described, when the projector 10 (see FIG. 2) rotates according to the long axis R, the heat produced by the mercury lamp 14 will accumulate at different locations of the mercury lamp 14. In other words, if the cooling direction is fixed, the cooling effect cannot be maintained when the projector 10 is rotated by different angles.

For example, when the mercury lamp 14 in FIG. 3 is rotated according to the long axis R of the lamp wick 18, the second opening 152, the third opening 153, the fifth opening 162 (see FIG. 1) and the sixth opening 163 may be located at the relatively perpendicular direction D after being rotated. In other words, the heat produced by the mercury lamp 14 will accumulate at different locations of the mercury lamp 14 at different operation states. Therefore, the second opening 152 and the third opening 153 of the first flow channel 150 and the fifth opening 162 and the sixth opening 163 of the second flow channel 160 of the cooling system 100 of the present disclosure are configured to surround the lamp wick 18 of the mercury lamp 14. Particularly, the second opening 152 and the third opening 153 of the first flow channel 150 respectively have an opening direction D1 and an opening direction D2, the fifth opening 162 and the sixth opening 163 of the second flow channel 160 respectively have an opening direction D3 and an opening direction D4, and the opening directions D1, D2, D3, D4 are all perpendicular to the long axis R of the lamp wick 18. In this way, when the tilt sensor 110 measured the tilt angle of the projector 10, the controller 120 can control the first flow switch device 170 and the second flow switch device 180 based on the tilt angle to adjust the direction of cooling to the direction D that is perpendicular to the mercury lamp 14.

Back to FIG. 1. In the cooling system 100 of the present disclosure, the second opening 152 of the first flow channel 150 faces the fifth opening 162 of the second flow channel 160, and the third opening 153 of the first flow channel 150 faces the sixth opening 163 of the second flow channel 160. Furthermore, the second opening 152, the third opening 153, the fifth opening 162, and the sixth opening 163 are respectively located at four sides around the mercury lamp 14. Particularly, the relative positions of the second opening 152, the third opening 153, the fifth opening 162, and the sixth opening 163 to the mercury lamp 14 are fixed. As shown in FIG. 1, based on the horizontal position of the projector 10, the second opening 152 and the fifth opening 162 are respectively disposed at the left side and the right side of the mercury lamp 14, and the third opening 153 and the sixth opening 163 are respectively disposed at the lower side and the upper side of the mercury lamp 14. In other words, when the projector 10 are rotated according to the long axis R of the lamp wick 18, the second opening 152, the third opening 153, the fifth opening 162, and the sixth opening 163 are rotated simultaneously.

In order to clearly describe in the following embodiments, the aforesaid opening directions D1, D2, D3, D4 are used to define the direction relative to the space where the projector 10 is located, or the direction relative to the user. For example, in the embodiment in FIG. 1, since the projector 10 is put horizontally, thus, the opening direction D1 of the second opening 152 faces the mercury lamp 14 from the left side, the opening direction D3 of the fifth opening 162 faces the mercury lamp 14 from the right side, the opening direction D2 of the third opening 153 faces the mercury lamp 14 from the lower side, and the opening direction D4 of the sixth opening 163 faces the mercury lamp 14 from the upper side. The upper side here may be the direction that faces the direction of the ceiling, and the lower side may be the direction that faces the direction of the floor. In other words, when the projector 10 is rotated according to the long axis R of the lamp wick 18, the aforesaid opening directions D1, D2, D3, D4 are all respectively located at or close to any one of the upper side, the lower side, the left side, and the right side. In this way, when the projector 10 is rotated to different angle, the cooling can be operated at the opening that close to the perpendicular direction (as the aforesaid upper side and the lower side) to maintain the better cooling effect of the mercury lamp 14.

The first flow channel 150 of the flow guide structure 140 includes a first extending portion 155, a second extending portion 156, and a first connecting portion 154 connected with the first extending portion 155 and the second extending portion 156. The first extending portion 155 has the second opening 152, the second extending portion 156 has the third opening 153, and the first connecting portion 154 has the first opening 151. The second flow channel 160 includes a third extending portion 165, a fourth extending portion 166, and a second connecting portion 164 connected with the third extending portion 165 and the fourth extending portion 166. The third extending portion 165 has the fifth opening 162, the fourth extending portion 166 has the sixth opening 163, and the second connecting portion 164 has the fourth opening 161. In other words, in the present embodiment, the first extending portion 155 is located at the left side of the mercury lamp 14, the second extending portion 156 is located at the lower side of the mercury lamp 14. The third extending portion 165 is located at the right side of the mercury lamp 14, and the fourth extending portion 166 is located at the upper side of the mercury lamp 14.

In the present embodiment, the first flow channel 150 and the second flow channel 160 are approximately configured symmetrically. In other words, the lengths of the first extending portion 155 and the second extending portion 156 are approximately the same, and the lengths of the third extending portion 165 and the fourth extending portion 166 are approximately the same. In this way, the air flow provided by the first fan 130a can uniformly pass through the first extending portion 155, the second extending portion 156, or simultaneously pass through the first extending portion 155 and the second extending portion 156. Similarly, the air flow provided by the second fan 130b can uniformly pass through the third extending portion 165, the fourth extending portion 166, or simultaneously pass through the third extending portion 165 and the fourth extending portion 166. However, the configuration of the first flow channel 150 and the second flow channel 160 are merely exemplary, the disclosure is not limited thereto.

The first flow switch device 170 is located in the first connecting portion 154 of the first flow channel 150, and the second flow switch device 180 is located in the second connecting portion 164 of the second flow channel 160. The first flow switch device 170 has a sensor 172, and the second flow switch device 180 has a sensor 182. The sensor 172 of the first flow switch device 170 is located in the first connecting portion 154 of the first flow channel 150 and is electrically connected to the controller 120, the sensor 182 of the second flow switch device 180 is located in the second connecting portion 164 of the second flow channel 160 and is electrically connected to the controller 120.

In some embodiments, the first flow switch device 170 and the second flow switch device 180 may be controlled by electrical power, for example, the stepping motor. In some embodiments, the first flow switch device 170 and the second flow switch device 180 may be controlled by magnetic power, for example, an electromagnet. Particularly, in some embodiments, the first flow switch device 170 and the second flow switch device 180 can make the air flow to pass through different extending portions or openings through the structures such as baffles or valves. The sensors 172, 182 can detect whether those structures are correctly been switched, and transfer the information to the controller 120.

In this way, if the sensor 172 doesn't sense the signal corresponding to the switch of the first flow switch device 170, or the sensor 182 didn't sense the signal corresponding to the switch of the second flow switch device 180, the controller 120 can employ the safety precautions to avoid damage of the mercury lamp 14. For example, the controller 120 may shut down the projection automatically or set alarm to warn the user about the abnormal condition of the cooling system 100 of the projector 10. Therefore, the cooling system 100 of the present disclosure can make sure that the air flow switch devices are working and maintain the mercury lamp 14 to exist at a better cooling condition.

Different ways of cooling the mercury lamp 14 performed by the cooling system 100 in the following embodiments in FIG. 4 to FIG. 6 when the projector 10 is rotated to different angles will be described.

Figure 4:
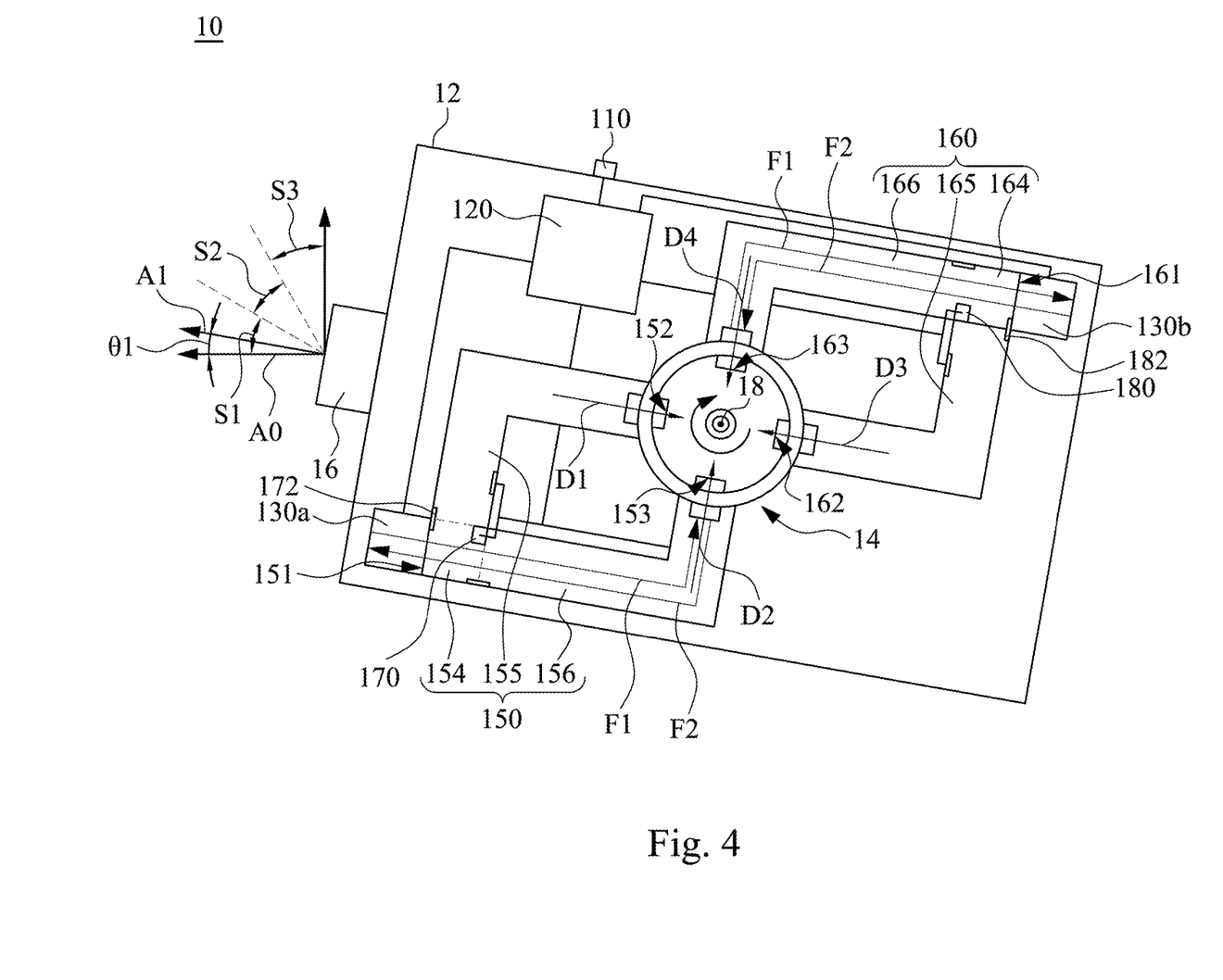
FIG. 4 is a side view of the projector in FIG. 1 when the projector is rotated by an angle.

FIG. 4 is a side view of the projector 10 in FIG. 1 when the projector 10 is rotated by an angle $\theta 1$. According to the embodiments in FIG. 2 and FIG. 3, the projector 10 is rotated according to the long axis R. Therefore, in the present embodiment, the projector 10 is rotated clockwise by an angle $\theta 1$ from the state in FIG. 1 (that is the lens 16 faces toward the direction A0 horizontally, and the direction A0 faces the left side) to make the lens 16 being rotated to the direction A1. Particularly, the projection direction of the projector 10 can be rotated toward upper side from the horizontal direction, for example, toward the direction of the ceiling.

In the present embodiment, the angle $\theta 1$ is located in the first section S1. In some embodiments, the first section S1 can be in the range from 0 degree to 30 degree, but the disclosure is not limited thereto. For example, the embodiment in FIG. 1 may correspond to the state when the angle $\theta 1$ is 0 degree, and the embodiment in FIG. 4 may correspond to the state when the angle $\theta 1$ is 30 degree. As shown in FIG. 4, when the projector 10 is disposed at rotation angle $\theta 1$ of the first section S1, the opening direction D1 and the opening direction D3 are respectively face the mercury lamp 14 from the direction close to the left side (the direction A0) and the direction close to the right side, and the opening direction D2 and the opening direction D4 are respectively face the mercury lamp 14 from the direction close to the lower side and the direction close to the upper side. Therefore, the tilt sensor 110 can controls the first flow switch device 170 to open the second extending portion 156 corresponding to the opening direction D2 that is close to the lower side (it is to close the first extending portion 155 corresponding to the opening direction D1 that close to the left side), and controls the second flow switch device 180 to open the fourth extending portion 166 corresponding to the opening direction D4 that is close to the upper side (it is to close the third extending portion 165 corresponding to the opening direction D3 that close to the right side). The sensor 172, 182 can respectively detect whether the first flow switch device 170 and the second flow switch device 180 perform the action of switch correctly, and transfer the information to the controller 120.

In this way, the first fan 130a and the second fan 130b can form an air flow F1 that sequentially passes through the second extending portion 156, the mercury lamp 14, and the fourth extending portion 166, or can form an air flow F2 that sequentially pass through the fourth extending portion 166, the mercury lamp 14, and the second extending portion 156. Particularly, as shown in FIG. 4, the air flow F1 can be blown by the first fan 130a toward the first connecting portion 154, and the air flow F1 is blown out by the second fan 130b after sequentially passing through the second extending portion 156, the mercury lamp 14, and the fourth extending portion 166, or the air flow F2 can be blown by the second fan 130b toward the second connecting portion 164, and the air flow F2 is blown out by the first fan 130a after sequentially passing through the fourth extending portion 166, the mercury lamp 14, and the second extending portion 156. Furthermore, in some embodiments, when the air flow F1 is blown by the first fan 130a toward the first connecting portion 154, the second fan 130b may draw out the air to make the air flow F1 be more powerful and smooth. Otherwise, when the air flow F2 is blown by the second fan 130b toward the second connecting portion 164, the first fan 130a may draw out the air to make the air flow F2 be more powerful and smooth.

Figure 5:
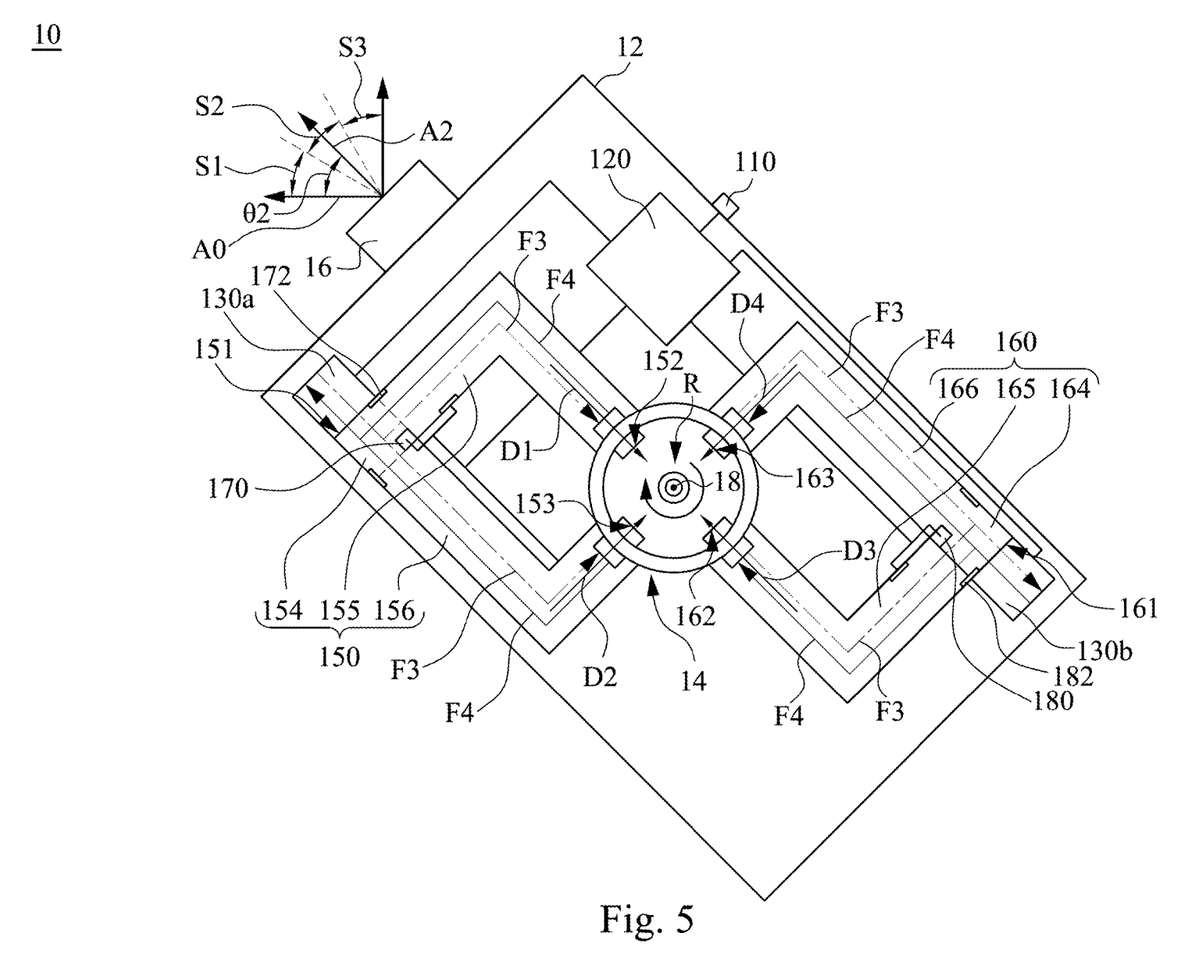
FIG. 5 is a side view of the projector FIG. 1 when the projector is rotated by an angle.

FIG. 5 is a side view of the projector 10 FIG. 1 when the projector 10 is rotated by an angle 82. In the present embodiment, the projector 10 is rotated clockwise by an angle 82 from the state in FIG. 1 (that is the lens 16 faces toward the direction A0 horizontally, and the direction A0 faces the left side) to make the lens 16 being rotated to the direction A2. Particularly, the projection direction of the projector 10 can be rotated toward upper side from the horizontal direction, for example, toward the direction of the ceiling.

In the present embodiment, the angle 82 is located in the second section S2. In some embodiments, the second section S2 can be in the range from 30 degree to 60 degree, but the disclosure is not limited thereto. As shown in FIG. 5, when the projector 10 is disposed at rotation angle 82 of the second section S2, the opening direction D1 and the opening direction D3 are respectively face the mercury lamp 14 from the direction close to the left-upper side and the direction close to the right-lower side, and the opening direction D2 and the opening direction D4 are respectively face the mercury lamp 14 from the direction close to the left-lower side and the direction close to the right-upper side. Therefore, the tilt sensor 110 can controls the first flow switch device 170 to simultaneously open the first extending portion 155 corresponding to the opening direction D1 that is close to the upper side and the second extending portion 156 corresponding to the opening direction D2 that is close to the lower side, and controls the second flow switch device 180 to simultaneously open the opening the fourth extending portion 166 corresponding to the opening direction D4 that is close to the upper side and the third extending portion 165 corresponding to the opening direction D3 that close to the lower side. The sensor 172, 182 can respectively detect whether the first flow switch device 170 and the second flow switch device 180 perform the action of switch correctly, and transfer the information to the controller 120.

In this way, the first fan 130a and the second fan 130b can form an air flow F3 that sequentially passes through the first flow channel 150, the mercury lamp 14, and the second flow channel 160, or can form an air flow F4 that sequentially pass through the second flow channel 160, the mercury lamp 14, and first flow channel 150. Particularly, the air flow F3 can be blown by the first fan 130a toward the first connecting portion 154, and the air flow F3 is blown out by the second fan 130b after sequentially passing through the first flow channel 150, the mercury lamp 14, and the second flow channel 160, or the air flow F4 can be blown by the second fan 130b toward the second connecting portion 164, and the air flow F2 is blown out by the first fan 130a after sequentially passing through the second flow channel 160, the mercury lamp 14, and first flow channel 150. Furthermore, in some embodiments, when the air flow F3 is blown by the first fan 130a toward the first connecting portion 154, the second fan 130b may draw out the air to make the air flow F3 be more powerful and smooth. Otherwise, when the air flow F4 is blown by the second fan 130b toward the second connecting portion 164, the first fan 130a may draw out the air to make the air flow F4 be more powerful and smooth.

Figure 6:
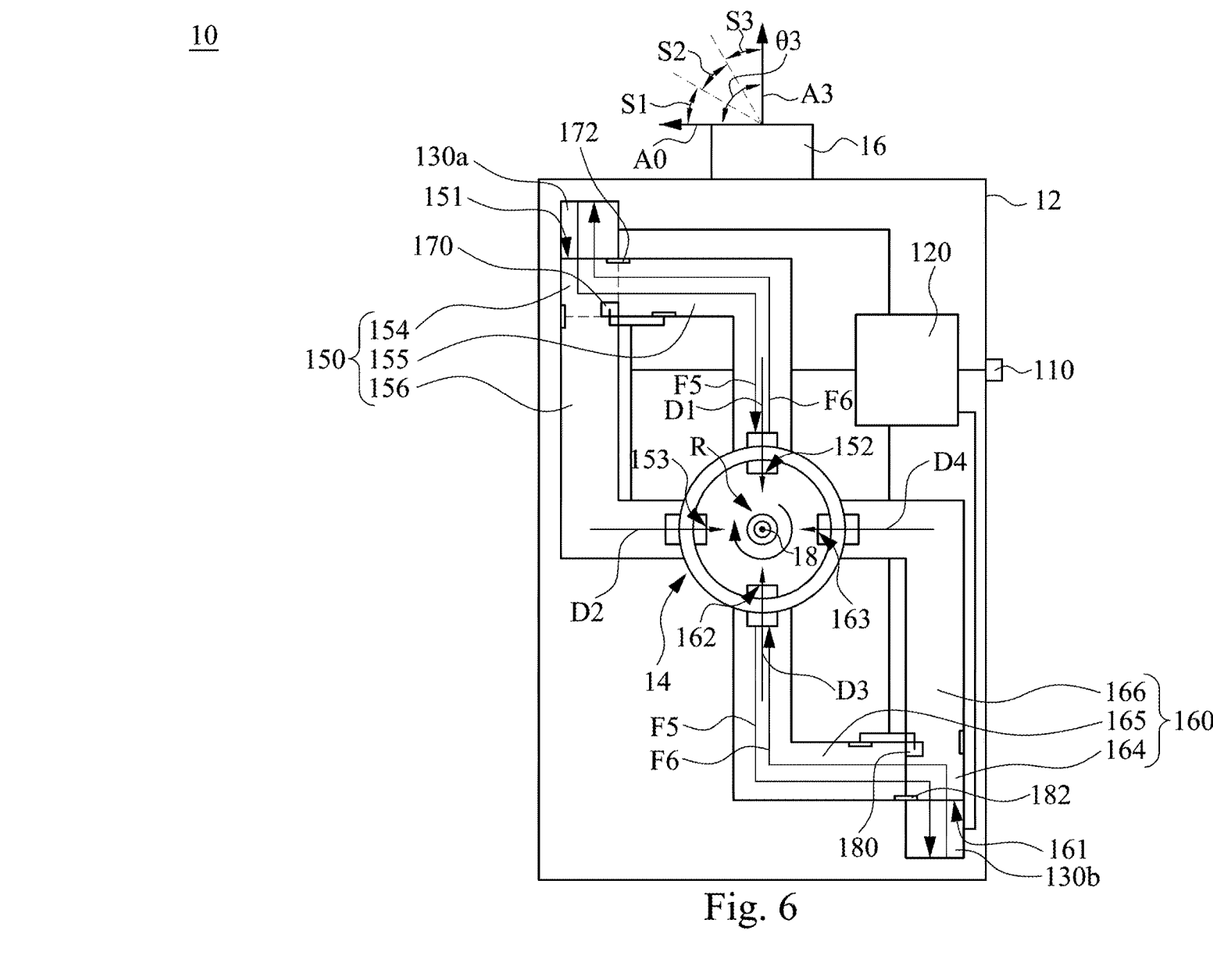
FIG. 6 is a side view of the projector FIG. 1 when the projector is rotated by an angle.

FIG. 6 is a side view of the projector 10 in FIG. 1 when the projector 10 is rotated by an angle 83. In the present embodiment, the projector 10 is rotated clockwise by an angle 83 from the state in FIG. 1 (that is the lens 16 faces toward the direction A0 horizontally, and the direction A0 faces the left side) to make the lens 16 being rotated to the direction A3. Particularly, the projection direction of the projector 10 can be rotated toward upper side from the horizontal direction, for example, toward the direction of the ceiling.

In the present embodiment, the angle 83 is located in the first section S3. In some embodiments, the first section S3 can be in the range from 60 degree to 90 degree, but the disclosure is not limited thereto. As shown in FIG. 6, when the projector 10 is disposed at rotation angle 83 of the first section S3, the opening direction D1 and the opening direction D3 are respectively face the mercury lamp 14 from the direction close to the upper side and the direction close to the lower side, and the opening direction D2 and the opening direction D4 are respectively face the mercury lamp 14 from the direction close to the left side and the direction close to the right side. Therefore, the tilt sensor 110 can controls the first flow switch device 170 to open the first extending portion 155 corresponding to the opening direction D1 that is close to the upper side (it is to close the second extending portion 156 corresponding to the opening direction D2 that close to the left side), and controls the second flow switch device 180 to open the third extending portion 165 corresponding to the opening direction D3 that is close to the lower side (it is to close fourth extending portion 166 corresponding to the opening direction D4 that close to the right side). The sensor 172, 182 can respectively detect whether the first flow switch device 170 and the second flow switch device 180 perform the action of switch correctly, and transfer the information to the controller 120.

In this way, the first fan 130a and the second fan 130b can form an air flow F5 that sequentially passes through the first extending portion 155, the mercury lamp 14, and the third extending portion 165, or can form an air flow F6 that sequentially pass through the third extending portion 165, the mercury lamp 14, and t the first extending portion 155. Particularly, the air flow F5 can be blown by the first fan 130a toward the first connecting portion 154, and the air flow F5 is blown out by the second fan 130b after sequentially passing through the first extending portion 155, the mercury lamp 14, and the third extending portion 165, or the air flow F2 can be blown by the second fan 130b toward the second connecting portion 164, and the air flow F2 is blown out by the first fan 130a after sequentially passing through the third extending portion 165, the mercury lamp 14, and t the first extending portion 155. Furthermore, in some embodiments, when the air flow F5 is blown by the first fan 130a toward the first connecting portion 154, the second fan 130b may draw out the air to make the air flow F5 be more powerful and smooth. Otherwise, when the air flow F6 is blown by the second fan 130b toward the second connecting portion 164, the first fan 130a may draw out the air to make the air flow F6 be more powerful and smooth.

According to the embodiments in FIG. 4 to FIG. 6, since the controller 120 can control the first flow switch device 170 and the second flow switch device 180 based on the tilt angle, the cooling of the mercury lamp 14 can be performed from the perpendicular direction by the cooling system 100 through the configuration of the first extending portion 155, the second extending portion 156, the third extending portion 165, and the fourth extending portion 166. In this way, degrading of the cooling effect for the mercury lamp 14 due to different tilt angles of the projector 10 can be prevented, thus the mercury lamp 14 can be maintained in a suitable temperature range to prolong the life spans of the mercury lamp 14 and the projector 10.

The foregoing has outlined features of several embodiments. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. A cooling system applied for a projector, the projector comprises a housing and a mercury lamp, the cooling system comprising:
    a tilt sensor disposed on the housing and configured to sense a tilt angle of the projector;
    a controller electrically connected to the tilt sensor;
    a first fan and a second fan electrically connected to the controller and configured to form an air flow; and
    a flow guide structure, comprising:
        a first flow channel comprising a first opening, a second opening and a third opening, wherein the first opening faces the first fan, the second opening and the third opening face the mercury lamp;
        a second flow channel comprising a fourth opening, a fifth opening and a sixth opening, wherein the fourth opening faces the second fan, the fifth opening and the sixth opening face the mercury lamp; and
        two flow switch devices respectively disposed in the first flow channel and the second flow channel and electrically connected to the controller, wherein the controller controls the flow switch devices based on the tilt angle to make the air flow pass through at least one of the second opening and the third opening and at least one of the fifth opening and the sixth opening.

2. The cooling system of claim 1, wherein the mercury lamp comprises a lamp wick, the long axis of the lamp wick is perpendicular to the directions of the second opening and the third opening of the first flow channel and is perpendicular to the directions of the fifth opening and the sixth opening of the second flow channel.

3. The cooling system of claim 2, wherein the mercury lamp is surrounded by the second opening and the third opening of the first flow channel and is surrounded by the fifth opening and the sixth opening of the second flow channel.

4. The cooling system of claim 1, wherein the second opening and the third opening of the first flow channel respectively face the fifth opening and the sixth opening of the second flow channel.

5. The cooling system of claim 1, wherein the second opening and the third opening are respectively disposed at the left side and the lower side of the mercury lamp, and the fifth opening and the sixth opening are respectively disposed at the right side and the upper side of the mercury lamp.

6. The cooling system of claim 1, wherein the first flow channel comprises a first extending portion, a second extending portion and a first connecting portion connected with the first extending portion and the second extending portion, the second flow channel comprises a third extending portion, a fourth extending portion and a second connecting portion connected with the third extending portion and the fourth extending portion, the first extending portion and the second extending portion respectively comprise the second opening and the third opening, the third extending portion and the fourth extending portion respectively comprise the fifth opening and the sixth opening, and the two flow switch devices are respectively located in the first connecting portion and the second connecting portion.

7. The cooling system of claim 1, wherein the first extending portion and the third extending portion are respectively located at the left side and the right side of the mercury lamp, and the fourth extending portion and the fifth portion are respectively located at the upper side and the lower side of the mercury lamp.

8. The cooling system of claim 1, wherein the two air flow switch devices respectively comprise a sensor electrically connected to the controller.

9. A projector, comprising:
    a housing;
    a mercury lamp comprising a lamp wick;
    a tilt sensor disposed on the housing and configured to sense a tilt angle of the projector;
    a controller electrically connected to the tilt sensor;
    a first fan and a second fan electrically connected to the controller and configured to form an air flow; and
    a flow guide structure, comprising:
        a first flow channel comprising a first opening, a second opening and a third opening, wherein the first opening faces the first fan, the second opening and the third opening face the mercury lamp;
        a second flow channel comprising a fourth opening, a fifth opening and a sixth opening, wherein the fourth opening faces the second fan, the fifth opening and the sixth opening face the mercury lamp; and
        two flow switch devices respectively disposed in the first flow channel and the second flow channel and electrically connected to the controller, wherein the controller controls the flow switch devices based on the tilt angle to make the air flow pass through at least one of the second opening and the third opening and at least one of the fifth opening and the sixth opening.

10. The projector of claim 9, wherein the mercury lamp comprises a lamp wick, the long axis of the lamp wick is perpendicular to the directions of the second opening and the third opening of the first flow channel and is perpendicular to the directions of the fifth opening and the sixth opening of the second flow channel.

11. The projector of claim 10, wherein the mercury lamp is surrounded by the second opening and the third opening of the first flow channel and is surrounded by the fifth opening and the sixth opening of the second flow channel.

12. The projector of claim 9, wherein the second opening and the third opening of the first flow channel respectively face the fifth opening and the sixth opening of the second flow channel.

13. The projector of claim 9, wherein the second opening and the third opening are respectively disposed at the left side and the lower side of the mercury lamp, and the fifth opening and the sixth opening are respectively disposed at the right side and the upper side of the mercury lamp.

14. The projector of claim 9, wherein the first flow channel comprises a first extending portion, a second extending portion and a first connecting portion connected with the first extending portion and the second extending portion, the second flow channel comprises a third extending portion, a fourth extending portion and a second connecting portion connected with the third extending portion and the fourth extending portion, the first extending portion and the second extending portion respectively comprise the second opening and the third opening, the third extending portion and the fourth extending portion respectively comprise the fifth opening and the sixth opening, and the two flow switch devices are respectively located in the first connecting portion and the second connecting portion.

15. The projector of claim 14, wherein the first extending portion and the third extending portion are respectively located at the left side and the right side of the mercury lamp, and the fourth extending portion and the fifth portion are respectively located at the upper side and the lower side of the mercury lamp.

16. The projector of claim 9, wherein the two air flow switch devices respectively comprise a sensor electrically connected to the controller.

17. The projector of claim 14, wherein when the projector is rotated by an angle that in is in a first range, the two air flow switch devices are respectively located at positions that open the second extending portion and the fourth extending portion, when the angle is in a second range, one of the two air flow switch devices is located at positions that open the first extending portion and the second extending portion, and another of the two air flow switch devices is located at positions that open the third extending portion and the fourth extending portion, when the angle is in a third range, the two air flow switch devices are respectively located at positions that open the first extending portion and the third extending portion, the first range is smaller than 90 degree and greater than the second range, and the third range is greater than 0 degree and smaller than the second range.

18. The projector of claim 17, wherein when the angle is in the first range, the air flow formed by the first fan and the second fan sequentially passes through the second extending portion, the mercury lamp, and the fourth extending portion, or the air flow sequentially passes through the fourth extending portion, the mercury lamp, and the second extending portion.

19. The projector of claim 17, wherein when the angle is in the second range, the air flow formed by the first fan and the second fan sequentially passes through the first flow channel, the mercury lamp, and the second flow channel, or the air flow sequentially passes through the second flow channel, the mercury lamp, and the first flow channel.

20. The projector of claim 17, wherein when the angle is in the third range, the air flow formed by the first fan and the second fan sequentially passes through the first extending portion, the mercury lamp, and the third extending portion, or the air flow sequentially passes through the third extending portion, the mercury lamp, and the first extending portion.

* * * * *